United States Patent [19]

Greiner

[11] Patent Number: 5,312,481
[45] Date of Patent: May 17, 1994

[54] DIMENSIONAL NON-FABRIC PAINT AND ART-AND-CRAFT STRUCTURE PRODUCED THEREWITH

[76] Inventor: Marcia Greiner, 8328 Pawnee La., Niwot, Colo. 80503-8632

[21] Appl. No.: 15,354

[22] Filed: Feb. 8, 1993

[51] Int. Cl.⁵ .................. C08H 1/00; C08L 89/00
[52] U.S. Cl. .................. 106/157; 106/209; 106/211; 106/214; 106/272; 106/154.1
[58] Field of Search ............ 106/157, 209, 211, 214, 106/272, 154.1

[56] References Cited

U.S. PATENT DOCUMENTS

| | | | |
|---|---|---|---|
| 3,167,440 | 1/1965 | McVicker et al. | 106/150 |
| 3,427,176 | 2/1969 | Moriya | 106/157 |
| 3,742,052 | 6/1973 | Bordenca | 260/566 B |
| 3,873,485 | 3/1975 | Fichera | 106/272 X |
| 3,904,791 | 9/1975 | Iverson et al. | 427/277 |
| 4,018,926 | 4/1977 | Wommack, Jr. | 424/258 |
| 4,069,186 | 1/1978 | Ramig | 260/29.6 RB |
| 4,076,547 | 2/1978 | Lester et al. | 106/157 X |
| 4,386,964 | 6/1983 | Herbert | 106/157 X |
| 4,496,695 | 1/1985 | Sugio et al. | 525/391 |
| 4,572,862 | 2/1986 | Ellis | 428/245 |
| 4,721,756 | 1/1988 | Louie et al. | 525/245 |
| 5,002,789 | 3/1991 | Graf et al. | 426/540 |
| 5,028,456 | 7/1991 | Naton | 427/142 |
| 5,069,918 | 12/1991 | Graf et al. | 426/243 |

*Primary Examiner*—Daniel Zirker
*Attorney, Agent, or Firm*—John R. Flanagan

[57] ABSTRACT

A dimensional non-fabric paint is a mixture of flour, salt, water and colorant in the following approximate percentages by volume: flour-34; salt-34; water-26; and colorant-6. The paint can be deposited and adhered upon a substrate to provide a three-dimensional form rising above the substrate. The paint has an adhesion property when wet permitting objects to be set into the three-dimensional form of the paint after depositing and before drying of the paint on the substrate. The substrate is a material selected from a group including paper, concrete, wood and rubber.

16 Claims, 1 Drawing Sheet

DIMENSIONAL NON-FABRIC PAINT AND ART-AND-CRAFT STRUCTURE PRODUCED THEREWITH

BACKGROUND OF THE INVENTION

1. Field of the Invention

The present invention generally relates to materials for creative art-and-craft projects and, more particularly, is concerned with a dimensional non-fabric paint and an art-and-craft structure produced therewith.

2. Description of the Prior Art

Paint is a common material used in art-and-craft activities by children. The various types of paints which are currently available for use by children on substrates, such as paper sheets, cardboard and fabrics, are known as finger paints, water color paints and poster paints.

These prior art paints embody several significant limitations which make them much less than optimal for use as the medium in children's art-and-craft activities. First, each paint leaves only a flat, substantially non-dimensional, paint residue when applied to a substrate which thereby limits its use to creation of non-dimensional projects. Second, none of these paints have a glue-like property which would permit mounting of objects in the paint residue. Third, most of these paints are not easily washable from children's clothes so care must be taken to prevent soiling of clothes during use of the paints. Briefly stated, these existing prior art paints as a medium used in children's art-and-craft projects are quite messy to use and incompatible with the broad range of activities necessary to satisfy the creative urges of children and to hold the attention of children.

Another existing prior art paint is a permanent dimensional fabric paint used on a fabric material, such as T-shirts, sweatshirts and sweatpants. Permanent fabric paint also has several significant limitations. First, once fabric paint is applied, it is immediately permanent. In other words, once the fabric paint touches the fabric material the fabric paint is there to stay. The fabric paint cannot be washed away if it happens to land on the wrong location or on the wrong piece of the fabric material. Second, fabric paint has an unpleasant noxious odor.

Consequently, a need exists for a paint mixture useful as a medium in children's art-and-craft projects which avoids the above-noted limitations of prior art paints and also avoids introducing new limitations in their place.

SUMMARY OF THE INVENTION

The present invention provides a dimensional non-fabric paint and an art-and-craft structure produced therewith which satisfy the aforementioned needs by eliminating all of the limitations of the existing paints. The dimensional non-fabric paint provides a three-dimensional paint residue and has a glue-like property when wet which permits mounting and setting of various objects to facilitate construction of the desired art-and-craft project and embellishment thereof by the various objects. Also, the dimensional non-fabric paint is non-permanent and washable from children's clothes, as opposed to prior art dimensional permanent fabric paint which is designed to decorate clothing and remain a part of the clothing through repeated washings. Further, the dimensional non-fabric paint is odorless and can be pleasantly scented. In summary, the dimensional non-fabric paint of the present invention allows children to participate in a much broader range of creative activities than with existing prior art paints and thereby enhances and enrichs the quality of the hands-on fun experienced by children.

Accordingly, the present invention is directed to a dimensional non-permanent non-fabric paint, comprising a mixture of: (a) flour, in a percentage by volume range of 32 to 36; (b) salt, in a percentage by volume range of 32 to 36; (c) water, in a percentage by volume range of 24.5 to 27.5; and (d) colorant, in a percentage by volume range of 5.5 to 6.5. More particularly, the constituents of the paint mixture are in the following approximate percentages by volume: flour-34; salt-34; water-26; and colorant-6.

The flour is a natural flour selected from a group which includes wheat flour, corn flour, potato flour, tapicoca flour and waxy corn flour. The flour can also include natural starch. The salt is selected from a group which includes sodium chloride, potassium chloride, calcium chloride and magnesium chloride. The colorant is selected from a group which includes liquid tempera, dry powdered tempra and food coloring. The paint also includes a mold inhibitor, such as calcium propionate guard, in a percentage by volume of less than 1, added to the mixture of flour, salt, water and colorant. The paint further includes a substance added to the mixture of flour, salt, water and colorant to provide a scent.

The present invention also is directed to an art-and-craft structure, comprising: (a) a substrate; and (b) the dimensional non-fabric paint deposited and adhered upon the substrate in a three-dimensional form rising above the substrate. The paint is deposited wet and then dried upon substrate. The paint has an adhesion property when wet permitting objects to be set into and retained by the three-dimensional form of the paint after depositing and before drying of the paint on the substrate. The substrate is a substrate is a material selected from a group including paper, wood, concrete, rubber, egg shells, plastic, styrofoam and glass.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

The present invention relates to a dimensional non-fabric paint whose primary constituents are flour, salt, water and colorant. The dimensional non-fabric paint of the present invention preferably includes the above constituents in the approximate percentage by volume, as given below in Table I. The ranges within which the percentages of the constituents can vary are also given in Table I.

TABLE I

| Constituents | Preferred (%) | Range (%) |
|---|---|---|
| flour | 34 | 32–36 |
| salt | 34 | 32–36 |
| water | 26 | 24.5–27.5 |
| colorant | 6 | 5.5–6.5 |

The preferred flour is a natural flour, namely wheat flour. Other examples of suitable natural flours are corn, potato, tapicoca, and waxy corn. Also, natural flour is meant to include natural starches.

The preferred salt is ordinary table salt, or sodium chloride. Other examples of suitable salts are potassium chloride, calcium chloride and magnesium chloride. Salt acts as a drying agent, pulling out moisture in the mixture and helping the mixture to dry uniformly. Salt also gives texture to the paint and acts as a firming agent. The dimensional non-permanent non-fabric paint composition when first applied has a very desirable wet, shiny appearance. After thoroughly dried, the paint composition has a very sparkly, glittery, appearance due to the presence of the salt.

The preferred colorant is liquid tempera. Other examples of suitable colorants are food coloring and dry powdered tempera. Examples of colors are yellow, orange, red, blue, green and white, to name only some, as well as these same colors as neon colors.

The preferred formulation also includes an amount of mold inhibitor less than 1% by volume. A suitable mold inhibitor is calcium propionate. Further, the dimensional non-permanent non-fabric paint can be provided without any odor or with different pleasing scents by adding a substance such as natural and/or artificial oils, perfumes or flavorings.

Figure 1:
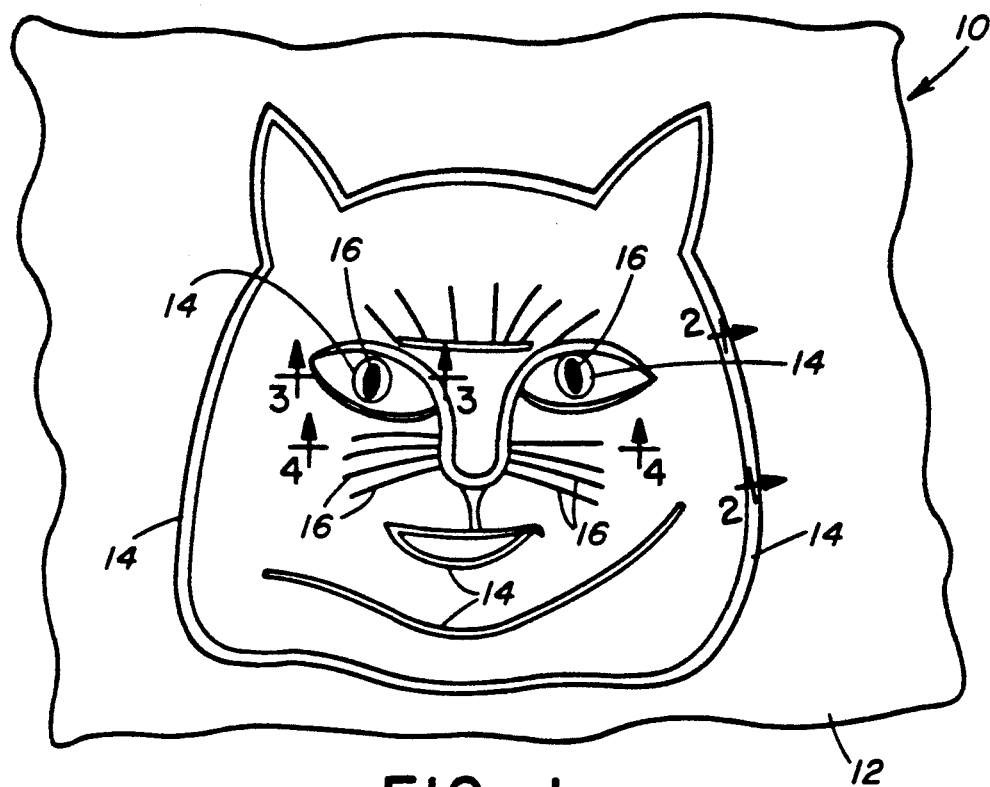
FIG. 1 is a layout view of an art-and-craft structure made by a dimensional non-fabric paint on a substrate in accordance with the present invention.
Figure 2:
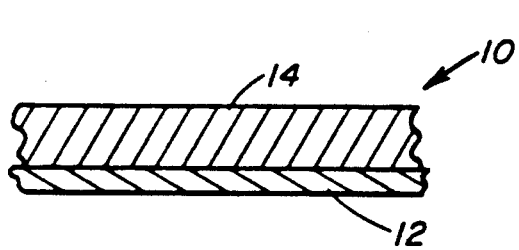
FIG. 2 is an enlarged longitudinal sectional view of the structure taken along line 2—2 of FIG. 1.
Figure 3:
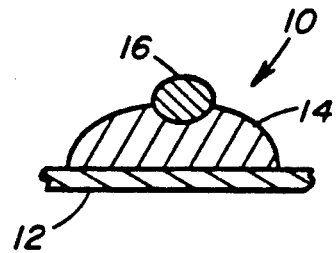
FIG. 3 is an enlarged cross-sectional view of the structure taken along line 3—3 of FIG. 1.
Figure 4:
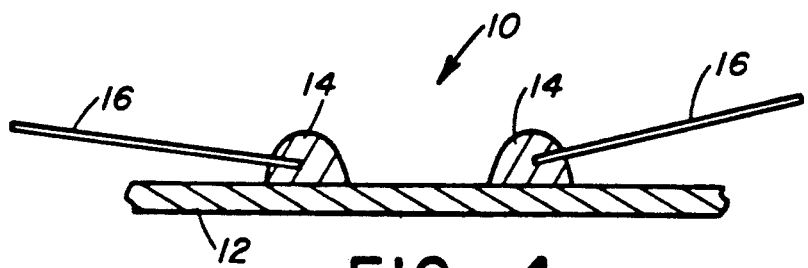
FIG. 4 is another enlarged cross-sectional view of the structure taken along line 4—4 of FIG. 1.

Referring to FIGS. 1-4, there is illustrated a fragment of an art-and-craft structure 10 in the form of the face of a cat, made of the dimensional non-permanent non-fabric paint of the present invention. The art-and-craft structure 10 includes a substrate 12 and the dimensional non-permanent non-fabric paint deposited and adhered upon the substrate 12 to provide a three-dimensional form 14 rising above the substrate 12. The paint is stored in wet form in any suitable container, such as a flexible plastic bottle (not shown). A string-like flow of the paint is produced from a nipple-like tip end of a cap on the bottom by squeezing on the opposite sides of the bottle.

Thus, the paint is deposited wet on the substrate 12 and then allowed to remain undisturbed for a period of time, such as from 1 to 20 hours depending upon the humidity of the atmosphere, to dry upon the substrate 12. Before drying, the paint has an adhesion property permitting objects 16, as shown in FIGS. 1-4, to be set into the three-dimensional form 14 of the paint upon the substrate 12. After the paint has dried, the objects 16 are securely retained in their desired mounted or set positions. Therefore, while wet, the paint acts as a glue on the substrate 12, allowing users to embellish their projects with objects, such as plastic jewels, feathers, plastic craft whiskers, glitter, buttons, fabric, stickers, sequins, etc.

The dimensional non-permanent non-fabric paint can be applied on and adhered to variety of different substrates 12. Examples of materials providing suitable substrates are a sheet of ordinary paper, a piece of wood or concrete, a plastic foam such as styrofoam, rubber such as found in balloons, and other materials such as craft fabrics, egg shells, glass and plastic.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A dimensional non-permanent non-fabric paint, comprising:
    a flowable liquid containable in a flexible bottle and dispensable in a string-shaped flow from the bottle, said liquid being a mixture of:
    (a) flour, in a percentage by volume range of 32 to 36;
    (b) salt, in a percentage by volume range of 32 to 36;
    (c) water, in a percentage by volume range of 24.5 to 27.5; and
    (d) colorant, in a percentage by volume range of 5.5 to 6.5.

2. The paint of claim 1 wherein the constituents of said paint are in the following approximate percentages by volume: flour-34; salt-34; water-26; and colorant-6.

3. The paint of claim 1 wherein said flour is a natural flour.

4. The paint of claim 3 wherein said natural flour is one selected from a group consisting of wheat flour, corn flour, potato flour, tapicoca flour and waxy corn flour.

5. The paint of claim 1 wherein said flour is wheat flour.

6. The paint of claim 1 wherein said flour includes a natural starch.

7. The paint of claim 1 wherein said salt is one selected from a group consisting of sodium chloride, potassium chloride, calcium chloride and magnesium chloride.

8. The paint of claim 1 wherein said salt is sodium chloride.

9. The paint of claim 1 wherein said colorant is one selected from a group including liquid tempera, dry powdered tempera and food coloring.

10. The paint of claim 1 further comprising:
    mold inhibitor, in a percentage by volume of less than 1, added to said mixture of flour, salt, water and colorant.

11. The paint of claim 10 wherein said mold inhibitor is calcium propionate.

12. The paint of claim 1 further comprising:
    substance added to said mixture of flour, salt, water and colorant to provide a scent.

13. A dimensional non-permanent non-fabric flowable liquid paint composition, consisting of a mixture of:
    (a) flour, in a percentage by volume range of 32 to 36;
    (b) salt, in a percentage by volume range of 32 to 36;
    (c) water, in a percentage by volume range to 24.5 to 27.5; and
    (d) colorant, in a percentage by volume range of 5.5 to 6.5.

14. A dimensional non-permanent non-fabric flowable liquid paint composition, consisting of a mixture of:
    (a) flour, in a percentage by volume range of 32 to 36;
    (b) salt, in a percentage by volume range of 32 to 36;

(c) water, in a percentage by volume range of 24.5 to 27.5;

(d) colorant, in a percentage by volume range of 5.5 to 6.5; and (e) a mold inhibitor, in a percentage by volume of less than 1.

15. A dimensional non-permanent non-fabric flowable liquid paint composition, consisting of a mixture of:

(a) flour, in a percentage by volume range of 32 to 36;

(b) salt, in a percentage by volume range of 32 to 36;

(c) water, in a percentage by volume range of 24.5 to 27.5;

(d) colorant, in a percentage by volume range of 5.5 to 6.5; and (e) a substance added to said mixture of flour, salt, water and colorant to provide a scent.

16. A dimensional non-permanent non-fabric flowable liquid paint composition, consisting of a mixture of:

(a) flour, in a percentage by volume range of 32 to 36;

(b) salt, in a percentage by volume range of 32 to 36;

(c) water, in a percentage by volume range of 24.5 to 27.5;

(d) colorant, in a percentage by volume range of 5.5 to 6.5;

(e) a mold inhibitor, in a percentage by volume of less than 1; and (f) a substance added to said mixture of flour, salt, water, colorant and mold inhibitor to provide a scent.

* * * * *